(12) United States Patent
Zell et al.

(10) Patent No.: US 7,042,489 B2
(45) Date of Patent: May 9, 2006

(54) IMAGE PROCESSING

(75) Inventors: Joachim Zell, Lorch (DE); Stephen Brett, Sutton-at-Home (GB)

(73) Assignee: Pandora International Limited, Kent (GB)

( * ) Notice: Subject to any disclaimer, the term of this patent is extended or adjusted under 35 U.S.C. 154(b) by 576 days.

(21) Appl. No.: 09/950,483

(22) Filed: Sep. 10, 2001

(65) Prior Publication Data

US 2002/0071029 A1   Jun. 13, 2002

(30) Foreign Application Priority Data

Sep. 8, 2000  (GB) .................................. 0022071

(51) Int. Cl.
*H04N 3/36* (2006.01)

(52) U.S. Cl. ......................... 348/97; 382/167

(58) Field of Classification Search ................ 348/97, 348/96, 759, 600; 358/1.9, 2.1; 382/284, 382/167

See application file for complete search history.

(56) References Cited

U.S. PATENT DOCUMENTS

| | | | |
|---|---|---|---|
| 4,218,698 A * | 8/1980 | Bart et al. ................. 348/600 |
| 5,661,800 A | 8/1997 | Nakashima et al. ........... 380/4 |
| 5,828,793 A * | 10/1998 | Mann ......................... 382/284 |
| 5,874,988 A * | 2/1999 | Gu ................................ 348/97 |
| 6,104,830 A * | 8/2000 | Schistad .................... 382/167 |
| 6,252,609 B1 * | 6/2001 | Kanno ........................ 345/501 |
| 6,580,470 B1 * | 6/2003 | Eckersley et al. .......... 348/771 |
| 6,646,762 B1 * | 11/2003 | Balasubramanian et al. . 358/1.9 |

FOREIGN PATENT DOCUMENTS

| | | |
|---|---|---|
| GB | 2 065 412 A | 6/1981 |
| GB | 2 278 514 A | 11/1994 |
| GB | 2 308 764 A | 7/1997 |
| WO | WO0055736 | 9/2000 |

* cited by examiner

*Primary Examiner*—Gims Philippe
(74) *Attorney, Agent, or Firm*—McDonnell Boehnen Hulbert & Berghoff LLP

(57) ABSTRACT

A system for scanning cinematographic film so as to produce digital images corresponding to the images on frames of the film is provided. The system includes means for scanning the film, means for displaying the digital images obtained by scanning the film, and image processing means. The image processing means includes means for adjusting the appearance attributes of the digital images obtained and further includes (a) means for displaying the output signal level versus time in graphical form for the images obtained, and/or (b) means for displaying the luminance, chrominance and saturation of the images obtained in graphical form on polar axes.

11 Claims, 8 Drawing Sheets

IMAGE PROCESSING

FIELD OF THE INVENTION

The present invention relates to image processing and in particular to the conversion of film images to video images and the appearance attribute correction of such images.

BRIEF DESCRIPTION OF THE PRIOR ART

Currently, there exist specialist machines ("telecine" machines) to scan cinema style motion picture film, and derive electrical signals for recording onto video tape or broadcasting as television pictures. One example of this is the 'URSA'® telecine manufactured by Rank Cintel Limited in Ware, England. Machines for scanning film at resolutions higher than those required for television and/or in non-real time are also known.

It is known to provide appearance attribute correction means in these telecines such that scenes may be studied, and an appearance attribute correction data set may be determined for individual scenes. The appearance attributes to be corrected could for example be chrominance, luminance or saturation of an image or they could be attributes relating to other characteristics of the image such as for example, sharpness or texture. The process of building up a series of appearance attribute correction values for a number of scenes, which is then used in a real time 'transfer' mode to effect the appearance attribute correction is taught in U.S. Pat. No. 4,096,523. An example of a telecine controller and programmer embodying such a process is the 'POGLE' produced by Pandora International Limited. In such a system, the appearance attribute correction data set is obtained by an operator viewing a scanned image on a monitor screen and manually adjusting the appearance attribute of the image until he is happy with the result.

The manual adjustments made by the controller are then stored so that they can be applied as the image is rescanned as described above.

It is also known in Post production to provide a waveform monitor and vectorscope to monitor the output signal level of images being broadcast. Waveform monitors provide an 'oscilloscope' type display which graphically displays the level of the output signal with respect to time. Conventionally in colour television, the monitor displays a signal trace of all the red lines, followed by all of the green lines, and all of the blue lines. These monitors are presently used in television broadcast applications to ensure that the level of signals being broadcast is not above the maximum allowable limit or below the minimum allowable limit due to corrections applied to the image signals during editing.

Vectorscopes provide a 'polar' colour chart in which the luminance axis is central on the screen, chrominance is shown as a variation from the luminance axis and saturation is judged by the distance from the neutral axis. These vectorscopes are also traditionally provided in television broadcast applications and can be used together with colour adjustment controls to adjust the luminance, chrominance and saturation of the signals being broadcast. Thus, for example, the signals can be adjusted if the vectorscope shows that any of chrominance, luminance or saturation is outside of a desired maximum range.

Conventionally, both waveform monitors and vectorscopes have been provided in the form of stand-alone hardware devices made from modified oscilloscopes. Thus, the devices are designed to operate at one specific resolution (usually this is the standard television broadcast definition of 576 lines).

A UK based company, Hamlet Ltd. manufacture alternative devices which operate as waveform monitors and vectorscopes but which do not include a cathode ray tube. These devices may be connected to any standard monitor display, such as a computer (SVGA) monitor to display the waveform monitor and vectorscope outputs. An example of such a system is the Hamlet Digi Scope DS601. However, these devices are again manufactured to meet a defined definition, i.e. either Standard Definition Television or High Definition Television.

Recent developments in the field of film scanning have led to the production of film scanners which scan film at a much higher resolution to that used in television. For example, scanners are increasingly being used to scan film at a resolution of about 2000 by 3000 ("film resolution"). A display capable of providing waveform monitor and vectorscope functionality at these high resolutions would provide a useful tool to an operator in monitoring the signal levels from the scanner output. However, no such display is presently available.

SUMMARY OF THE INVENTION

The present invention is based on the realisation that the functionality of a waveform monitor and vectorscope may be provided which will operate at any resolution at which film may be scanned by implementing the display functionality using software provided within a telecine controller and programmer such as the Pandora 'POGLE' described above or within a digital video processor provided downstream of a telecine machine. An example of a digital video processor which could be used is the DCP manufactured by Pandora International Limited and described in UK patent application No. GB 2278514A. An alternative video processor which could be used is the 'Megadef' manufactured by Pandora International Limited.

From a first aspect, the present invention provides a system for scanning cinematographic film so as to produce digital images corresponding to the images on frames of the film, the system comprising: means for scanning the film; means for displaying the digital images obtained by scanning the film; and image processing means including means for adjusting the appearance attributes of the digital images obtained, the image processing means further including (a) means for displaying the output signal level versus time for the images obtained in graphical form, and/or (b) means for displaying the luminance, chrominance and saturation of the images obtained in graphical form on polar axes.

Thus, with the invention described above, a system is provided by which a display having the functionality of a waveform monitor and vectorscope will operate at any scanning resolution of the film. Thus, the system would operate at Standard Definition and High Definition Television resolutions as well as at film scanning resolution and even resolutions at higher definitions such as 4000×3000.

The waveform monitor and vectorscope functionality of the processing means could be used merely to visually monitor the signal level and colour of the digital images obtained by the scanning process. However, it has been realised that, because the signal level output and colour display means are included in the same processing means as the appearance attribute correction means, the colour information provided by the display means may be used to automatically select the regions of the image for which appearance attribute corrections are required.

As is described in UK patent application No. GB 2278514A, in the Pandora DCP six separate controls are provided by which regions of an image having certain colour characteristics can be selected. These are in the form of a lower input select and higher input select for each of chrominance, saturation and luminance. Thus, in order to select part of an image in the DCP system, a user must adjust each of the six controls until the correct balance is achieved. In practice it is difficult for an operator to know which control to adjust to achieve this balance. This is because the operator must work out whether certain colours not being selected is due for example to the luminance maximum being too low to capture those colours or the colours being too saturated to fall within the higher saturation input select.

Using the system of the invention, a polar representation of the chrominance, luminance and saturation of the region to be selected for correction may be obtained and, using this, the operator can estimate the six control settings required to select that region. Thus, only minor adjustments to those estimated settings will need to be made in order to accurately select the whole region. Consequently, the selection process is made substantially quicker and easier by such a system.

Still more preferably, the system can include processing means for automatically computing the control settings required to select a region of the image wherein the settings are computed from the polar representation of the chrominance, luminance and saturation of the region to be selected for correction. In this way, the operator would only have to draw around a region of the image which they wished to select and the selection process could then be carried out automatically by the system.

In a further possible implementation of the system of the invention, a region of an image which an operator wished to colour correct could have a range of colours selected from another part of the image superposed onto it by defining the colours to be superposed in terms of vectors obtained from the polar representation of the chrominance, luminance and saturation of that other part of the image.

Preferably, the means for displaying the output signal level versus time and/or the means for displaying the chrominance, luminance and saturation of the images obtained in graphical form comprise a display screen and data processing means for providing data to be displayed to the screen.

Still more preferably, the display screen is also used to display the digital images obtained by scanning the film. Thus, an operator can view the adjustments made to the appearance attributes of the digital image and the waveform and/or vectorscope output on the same screen.

The data processing means could pass all of the data obtained by scanning the frames of the film to the display screen. However, very high computing power would be required to display waveform monitor and vectorscope representations of the full digital data set in real time. Consequently, when the film is being scanned in the transport mode the system is preferably configured so that the data processing means sort the digital image data so as to provide the display screen with only the maximum and minimum levels of the output signal over time and/or only the maximum and minimum levels of chrominance and saturation of the image for each group of one or more lines or columns of the image obtained.

This has the advantage that a relatively inexpensive industry standard computer having a lower computing power than would otherwise be required can be used to display the maximum and minimum levels of output signals versus time and/or the maximum and minimum chrominance and saturation to a user for each frame of an image as it is scanned in real time. Further, as the main purpose of the display is for an operator to determine whether the signal exceeds the maximum or minimum allowed levels at any time, the display of only the maximum and minimum signals to the operator allows this purpose to be fulfilled.

The intervals between the maximum and minimum levels shown on the display screen could be left blank. However, in order to make the display look more like prior art waveform monitors and vectorscopes, the intervals between the maximum and minimum levels shown on the display screen are preferably filled with grey level data.

The data processing means could be provided in any suitable form. Preferably, the data processing means are in the form of Field Programmable Gate arrays and still more preferably, they are provided by unused gates in the field programmable gate arrays which control the means for adjusting the appearance attributes of the digital images obtained.

This has the advantage that the output signal level data and/or chrominance and saturation data to be displayed can be taken from any desired stage in the processing of the image data. Thus, the system is preferably configured such that the output signal level and/or saturation, chrominance and luminance of the image may be displayed either as obtained from scanning the film or after one or more image correction steps have been carried out.

BRIEF DESCRIPTION OF THE DRAWINGS

Preferred embodiments of the invention will now be described by way of example only and with reference to the accompanying drawings in which:

FIG. 1 (FIG. 1a and 1b) shows a digital image displayed on a monitor screen. FIG. 1b is a line drawing showing the content of FIG. 1a;

FIG. 2 (FIG. 2a and FIG. 2b) shows a vectorscope type representation of the image of FIG. 1. FIG. 2b is a line drawing showing the content of FIG. 2a;

FIG. 3 (FIG. 3a and FIG. 3b) shows a vectorscope type representation of a portion of the image of FIG. 1. FIG. 3b is a line drawing showing the content of FIG. 3a;

DESCRIPTION OF THE PREFERRED EMBODIMENTS

In one preferred embodiment, the system according to the invention might include a film scanning machine such as the 'URSA' produced by Rank Cintel Limited together with a 'POGLE' control unit and a 'Megadef' video processor provided downstream of the telecine to carry out additional appearance attribute corrections on the digital images obtained from the telecine machine.

Figure 1A:
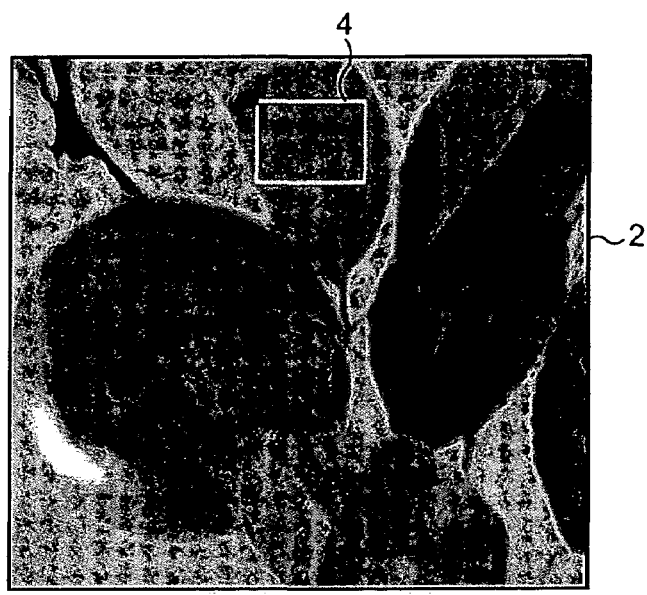
FIG. 1a is a screen image.
Figure 2A:
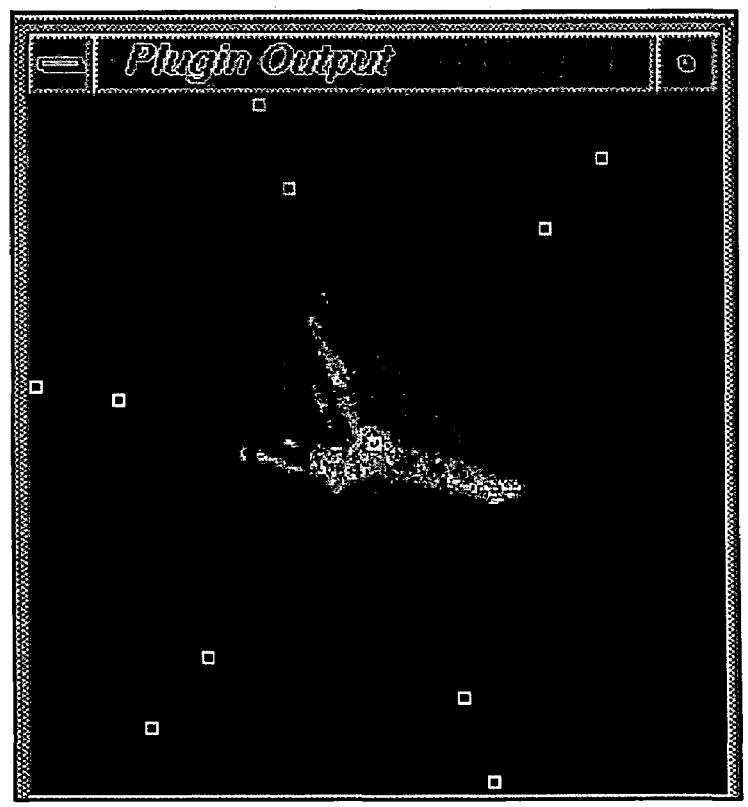
FIG. 2a is a screen image.
Figure 1B:
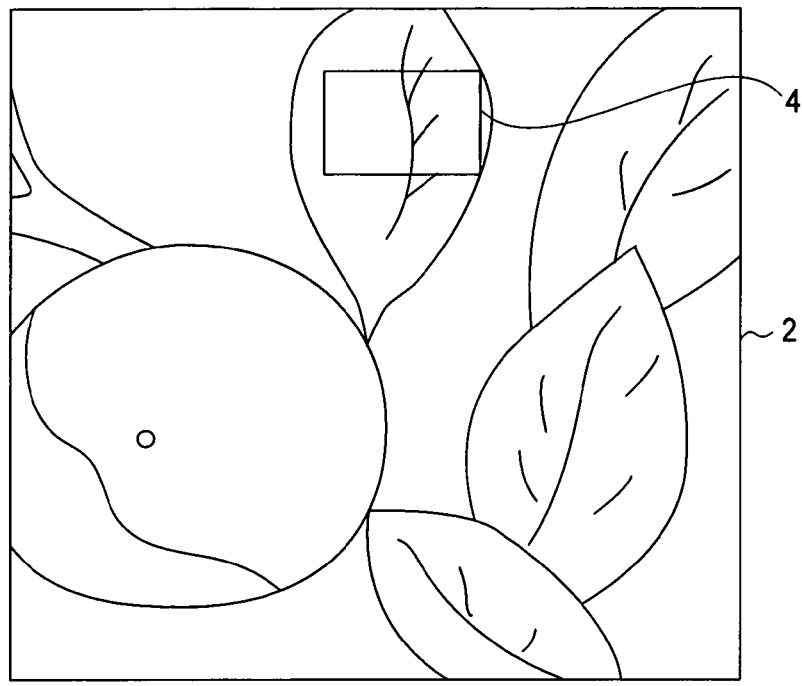
Figure 2B:
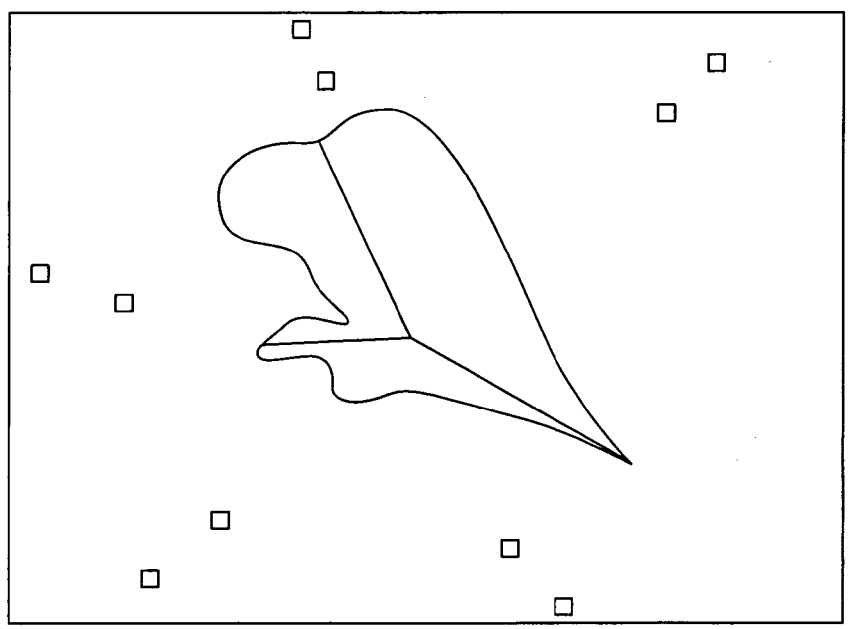

Software is built into the 'POGLE' control unit by means of which both waveform monitor and vectorscope type representations of the digital images obtained from the telecine machine are displayed on monitor screens. FIG. 1 shows an example of a digital image 2 obtained by scanning cinematographic film when displayed on a monitor screen. The vectorscope type representation of this image obtained by the 'POGLE' software is shown in FIG. 2. This image provides useful information to the operator when deciding how he wishes to alter the look of the image.

Figure 3A:
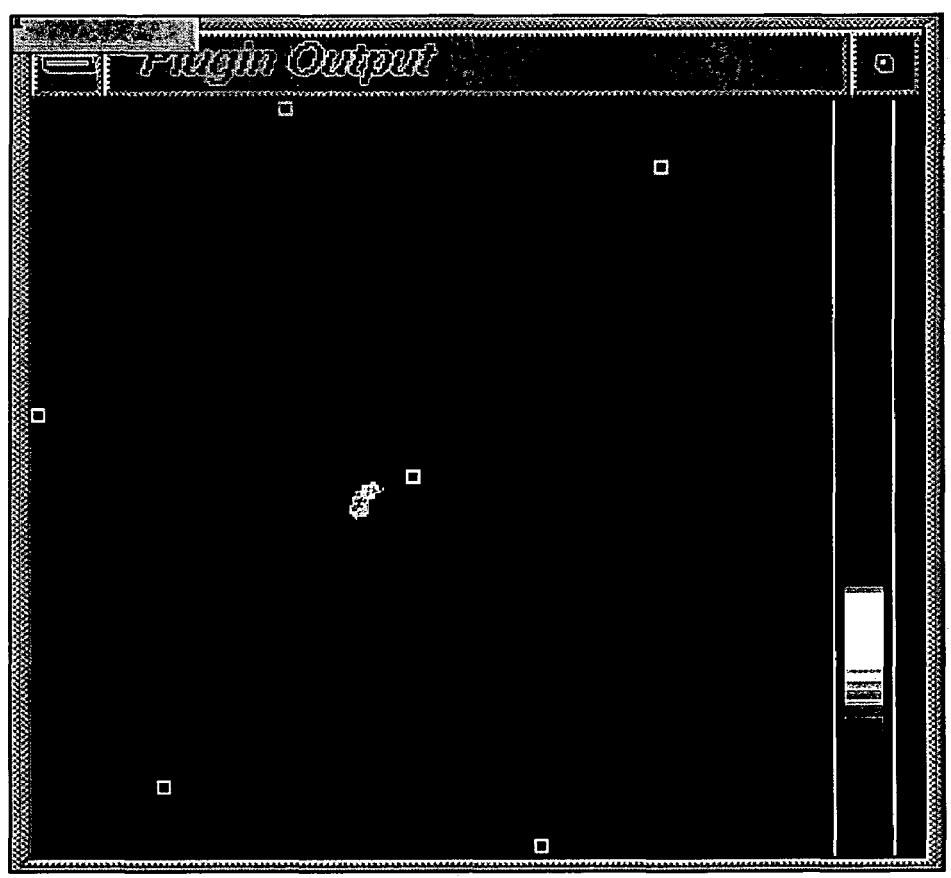
FIG. 3a is a screen image.
Figure 3B:
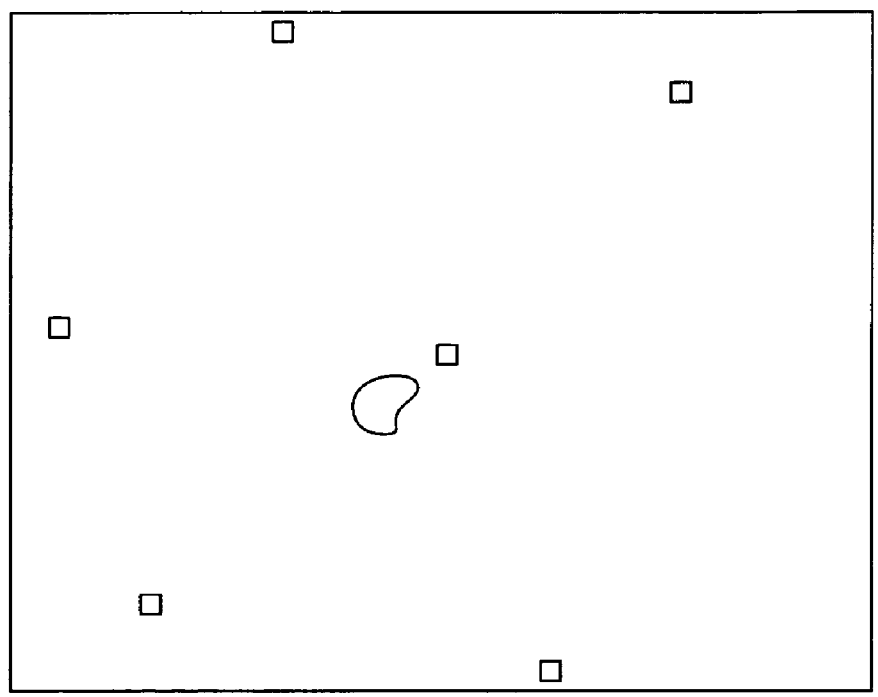

In order to select a region of the image which he wishes to alter, an operator draws a box 4 around that region as shown in FIG. 1. The 'POGLE' software then obtains a vectorscope type representation for that part of the image as shown in FIG. 3. In this representation, the chrominance is mainly in the third quadrant which is to be expected as this corresponds to green and the region of the image selected shows leaves. The system then translates the vectorscope type representation to a format which can be used to set the controls of the 'Megadef'. This format is shown at FIG. 4.

Figure 4:
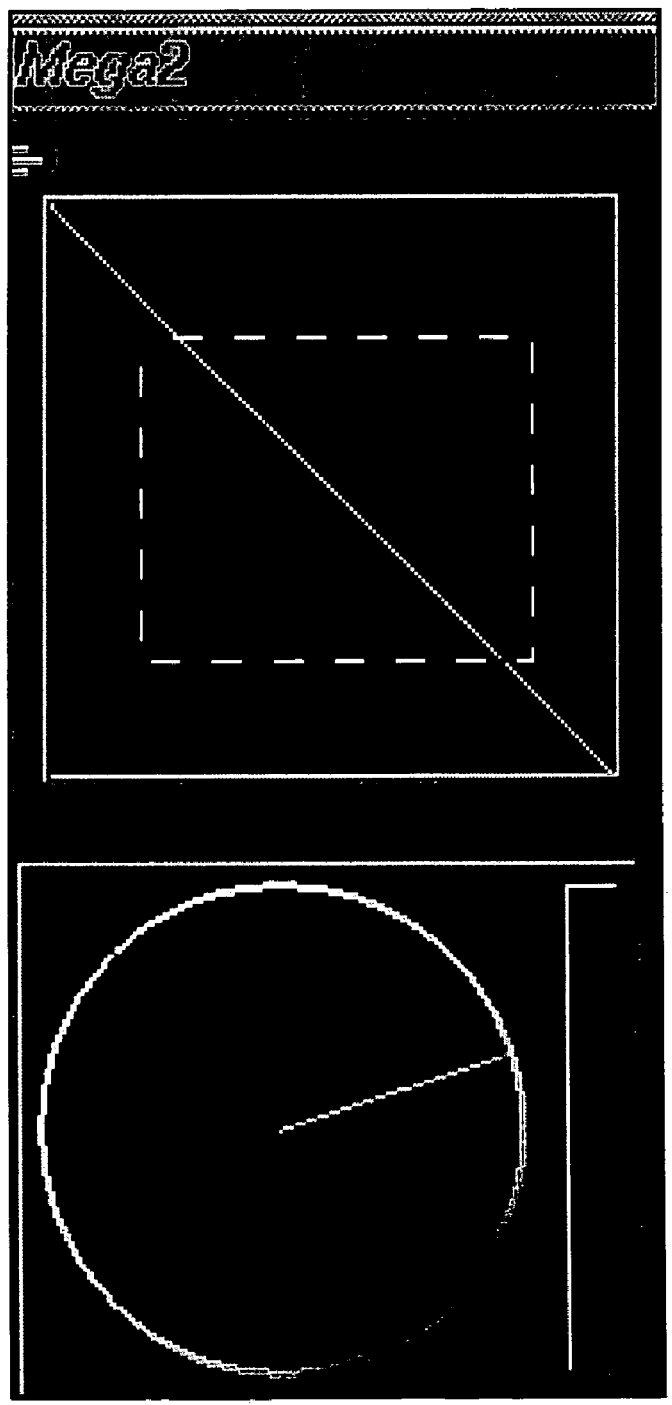
FIG. 4 shows the vector of FIG. 3 when translated into the format used in a telecine controller.

The chrominance, luminance and saturation information obtained (as represented in FIG. 4) is transferred to the 'Megadef' video processor via data processing means which calculate the control settings required in the 'Megadef' to select all of the image within the box 4 formed by the operator. Once this region has been automatically selected by the 'Megadef', it may be corrected in the usual manner using appearance attribute correction parameters stored in the 'Megadef'. Alternatively, the colours of the region could be replaced by colours selected from another part of the image using the same selection process as described above.

Figure 5:
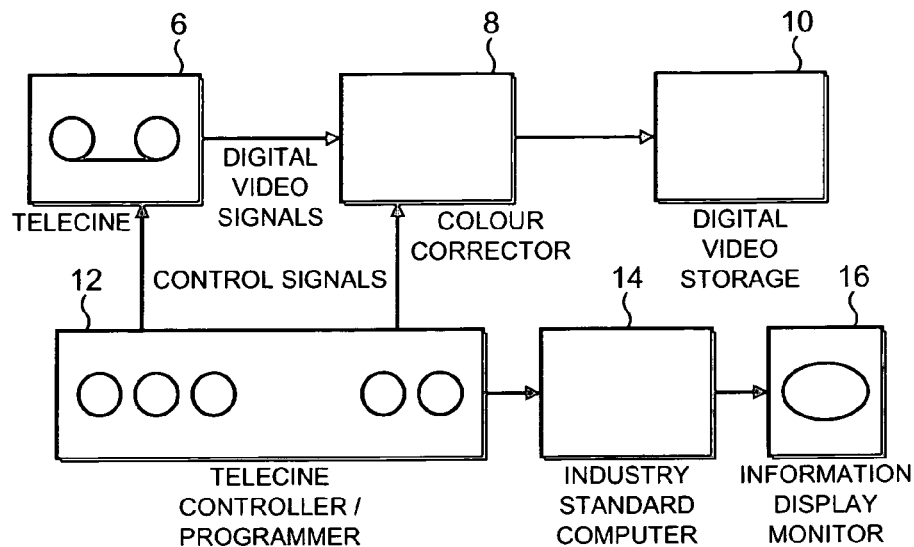
FIG. 5 shows a typical telecine suite incorporating a system according to the invention.

In a second embodiment of the invention, the system of the invention is provided within a typical telecine suite as shown in FIG. 5. The telecine suite includes a telecine machine 6, which transports the film and scans each frame in turn to produce digital signals corresponding to images on the film frames. The suite also includes an advanced colour corrector 8 (ideally this is a MEGADEF produced by Pandora International Limited). The colour corrector 8 receives the digital signals from the telecine 6, modifies the digital signals and feeds them out to digital video disk storage or digital video tape 10. The control parameters on the telecine 6 and colour corrector 8 are operated from a telecine programmer 12 (which in this embodiment is a POGLE® manufactured by Pandora International Limited).

The programmer 12 has two operating modes, the set-up mode and the run mode. In the set-up mode, an operator looks at the digital image obtained for a film frame representative of one particular scene. While viewing this image, the frame in question is held stationary in the film gate of the telecine machine. From the digital image of the representative film frame, the operator decides on adjustments to be made to the white level, contrast gain, mid tone rendition and colour balance for the whole scene. The programmer stores the values of the required adjustments for each scene so that when the real time transfer of the images from film to digital image data takes place, the required adjustment parameters for each scene are set by the programmer.

The telecine programmer 12 uses an industry standard computer 14 such as an SGI 02 computer to display the adjustment parameters on a monitor screen 16.

Figure 6:
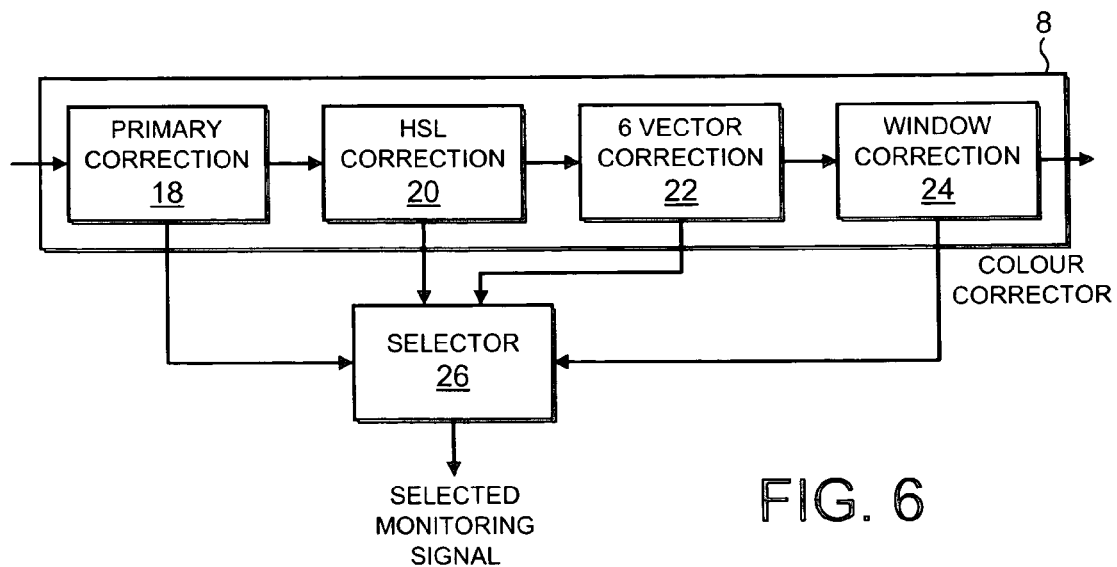
FIG. 6 shows an advanced colour corrector according to an embodiment of the invention.

As shown in FIG. 6, the advanced colour corrector 8 contains several stages. In the first stage 18, digital image data undergoes primary colour correction, using a one dimensional look up table for each of the red, green and blue parts of the image signals. The resulting red, green and blue signals are then converted through well known algorithms to hue, saturation and luminance. The hue, saturation and luminance values are then modified under operator control at 20. There is then a six vector colour correction stage 22, which allows independent adjustment of six user identified colour regions. Finally, operations are carried out in distinct areas or combinations of areas in the image frame as shown at 24. The resultant signals from this stage are then output to the digital image store which could be a file server or digital video tape 14 as described above.

Each of the processing stages 18 to 24 of the advanced colour corrector 8 is implemented through one or more field programmable gate arrays such as the Xilinx "Vertex" range available from Xilinx, 2100 Logic Drive, San Jose, Calif., USA. Gates in these devices which are not used for the main colour correction functions are configured from the Very High Level Design Language to transfer data to the monitor screen 16 to provide the waveform monitor and vectorscope display functionality of the invention. In the embodiment shown in FIG. 6, a gate at each of stages 18 to 24 is configured to allow the data to be transferred to the monitor. Selection means 26 are provided so that the operator can choose to view the waveform and vectorscope data output from any one of the stages 18 to 24. Thus, an operator cam simply diagnose which editorial stage in the colour corrector is causing image level overflow or underflow.

In a further improved embodiment of the invention a system as described above with reference to FIGS. 5 and 6 is provided in which the gates of the field programmable gate arrays configured from the Very High Level Design Language are configured to sort the digital image data to reduce the amount of data supplied to the monitor screen when the telecine programmer is operating in the run mode. This allows the data transferred to be displayed in a waveform or vectorscope mode on the monitor screen of a relatively inexpensive industry standard computer such as an O2 model computer from Silicon Graphics Inc. of Mountain View, Calif., USA.

In the alternative embodiment where film was scanned at a relatively high resolution such as for example the 2K resolution and the data was not reduced prior to transfer to the monitor, the display of the data in the run mode in real time at a scan rate of 25 frames per second would require approximately 350 Megabytes per second of data to be transferred. Computers capable of handling this bandwidth of data and having the associated processing power are available (an example being the ONYX 2 model from Silicon Graphics Incorporated when fitted with an interface of the HIPPI standard) however they are very expensive. The lower bandwidth computer which can be used after sorting the data is approximately 1% of the cost.

For a given frame of digital image data, the data is sorted by finding the pixels having the highest and lowest signal values in each column of the image and transferring those values to the display. To do this, the first picture element in a column is looked at and by definition, this becomes both the highest and lowest signal value so far. Thus, these values are copied to the lowest value so far and highest value so far registers provided in a buffer store (not shown). The second picture element in the column is then tested, and if the value of this element is either higher or lower than that of the earlier elements, it is used to replace the value in the lowest value so far or highest value so far registers. This operation is repeated from each picture element in the column and for each column in the image frame. Thus, the data is reduced to two values per column of the image. These values are transferred to the computer and monitor 16 thus resulting in a very low volume of data to be transmitted. Due to the low volume of data, the data can be transferred over an industry standard Ethernet of the 10BaseT format which is very cost effective.

Clearly, the system could equally well be configured to sort the digital image data per line of the data rather than per column thereof. Further, to reduce the amount of data for transfer even more, the data could be sorted by averaging the data of each group of two or more lines or columns.

Further, the system is configured to allow an operator to select only one line or a small group of lines of the image to analyse. To do this, the operator moves a cursor onto the image display and the system then selects a narrow range of lines adjacent the cursor and sorts and transfers data for these lines only to the display.

Figure 7:
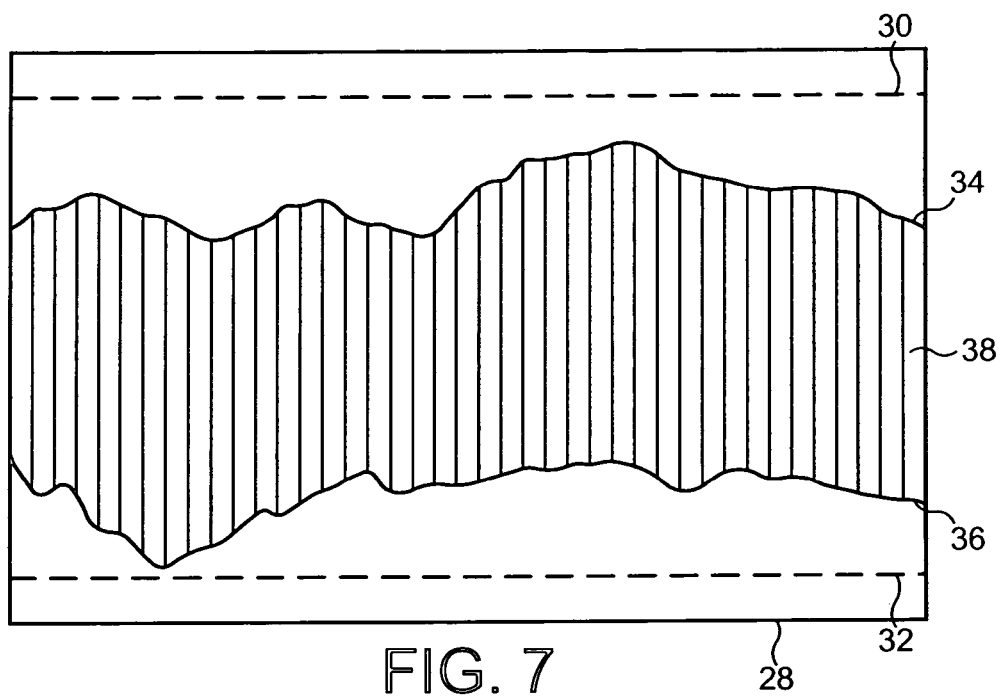
FIG. 7 shows a waveform monitor display according to an embodiment of the invention.

The data representing the maximum and minimum signal levels for each column of the image is then displayed on the monitor 16 through the graphics card of the computer thus giving the operator an indication of the range of data for that image frame. FIG. 7 shows a waveform monitor type display 28 for a monochrome signal on which the maximum allowable output signal level 30 and the minimum allowable output signal level 32 are marked. As shown, the maximum 34 and minimum 36 signal levels for each column of the image are displayed on the monitor 16 and grey level data is used to fill the interval 38 between the maximum and minimum signals. Using this display, an operator can easily ascertain if the maximum or minimum allowable signal limits are exceeded by the image signal at any time.

Figure 8:
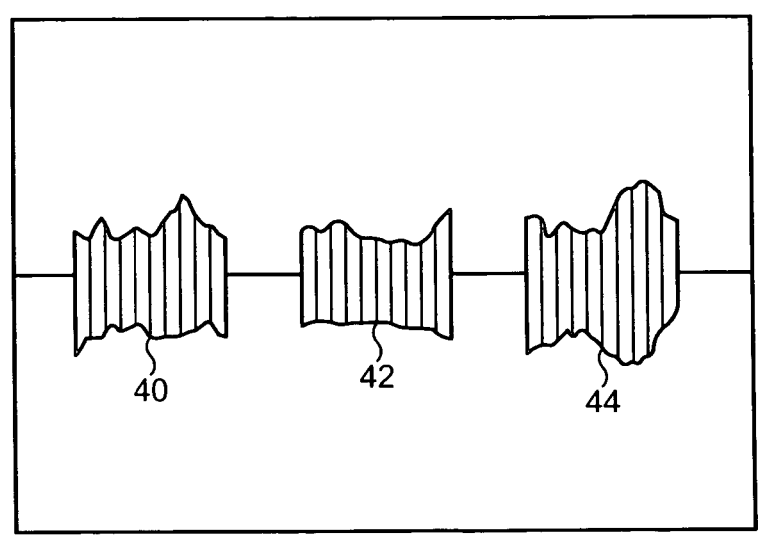
FIG. 8 shows a waveform monitor display according to another embodiment of the invention.

Clearly, the type of display of FIG. 7 is equally applicable to a colour signal. In this case, the outputs for each of the red 40, green 42, and blue 44 signals are sorted and displayed separately as in FIG. 8.

The embodiment of the system in which the data is sorted prior to being transferred to the display means additionally includes means for converting the signals from RGB values into hue, saturation and luminance values so that the data can be sorted to find the maximum and minimum saturation and hue values for each column or line of image data. This conversion is carried out where a vectorscope type representation is required in the run mode. The conversion is implemented in a pre-programmed look up table using well known conversions as documented in "The Reproduction of Colour" (4th Edition) by Dr. R W G Hunt and published by Fountain Press, ISBN No 085242356X.

Figure 9:
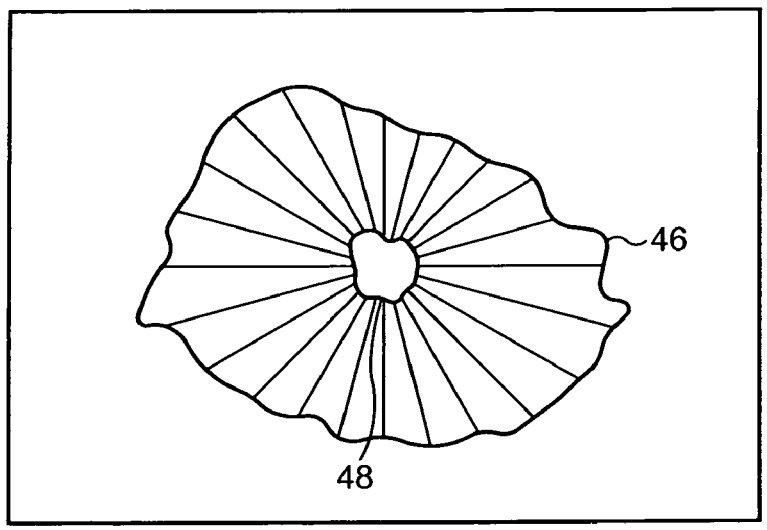
FIG. 9 shows a vectorscope display according to the invention.
Figure 10:
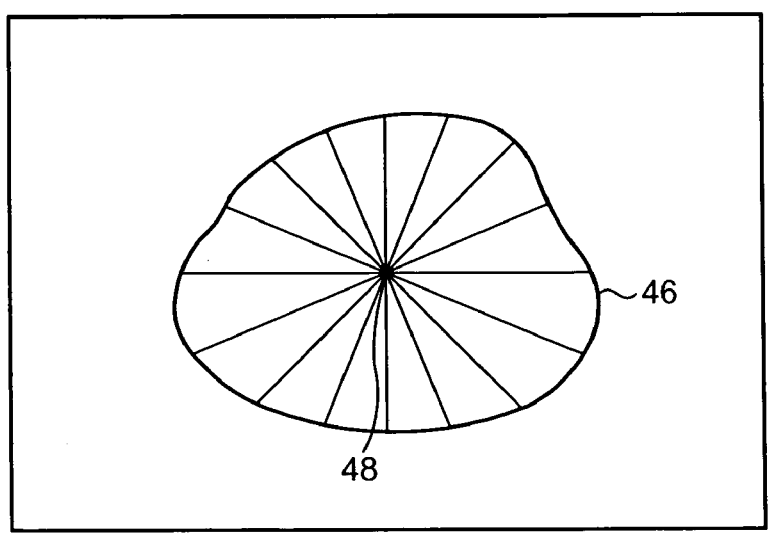
FIG. 10 shows a different vectorscope display according to the invention.

The vectorscope type display provided is only given for one value of luminance at any one time. However, the system is configured such that the operator can alter the luminance level for which the vectorscope type display is generated. FIG. 9 shows a vectorscope type display provided by the system described showing the maximum saturation levels 46 and the minimum levels 48. In practice, most images contain neutral tones such that the minimum levels 48 will usually be located at the central axis as shown in FIG. 10.

It will be understood that when the telecine programmer is in setup mode, one frame of film will be stationary in the telecine for quite some time. Thus, in this mode, the intervals between the maximum and minimum signal levels can be filled with actual data rather than grey level data as long as the film frame is stationary for a sufficient length of time.

Although the present invention has been described in relation to a particular embodiment thereof, many other modifications and variations and other uses will become apparent to those skilled in the art. It is preferred therefore, that the present invention be limited not by the specific disclosure herein, but only by the scope of the appended claims.

What is claimed is:

1. A system for scanning cinematographic film so as to produce digital images corresponding to the images on frames of the film, the system comprising:
   a film scanner;
   a display device for displaying the digital images obtained by scanning the film; and
   an image processor including a device for adjusting the appearance attributes of the digital images obtained, wherein the device is adapted to display in graphical form (a) the output signal level versus time for the images obtained, and/or (b) the luminance, chrominance and saturation on polar axes of the images obtained.

2. A system as claimed in claim 1, wherein the output signal level and/or the luminance, chrominance and saturation of the images is used to automatically select regions of the images for which appearance attribute corrections are required.

3. A system as claimed in claim 2, wherein the system includes a processor for automatically computing the control settings required to select a region of an image, wherein the control settings are computed from the polar representation of the chrominance, luminance and saturation of the region to be corrected.

4. A system as claimed in claim 1, wherein a range of colours selected from one part of the image can be superposed onto a part of the image to be colour corrected by defining the colours to be superposed in terms of vectors obtained from the polar representation of the chrominance, luminance and saturation of that one part of the image.

5. A system as claimed in claim 1, wherein the image processor comprises a display screen and a data processor for providing data to be displayed to the screen so as to allow the output signal level versus time and/or the luminance, chrominance and saturation of the images obtained on polar axes to be displayed in graphical form on the display screen.

6. A system as claimed in claim 5, wherein the display screen is also used to display the digital images obtained by scanning the film.

7. A system as claimed in claim 5, wherein the data processor sorts the digital image data so as to reduce the amount of data provided to the display screen when the film is being scanned in the transport mode.

8. A system as claimed in claim 7, wherein the data processor sorts the digital image data so as to provide only the maximum and minimum levels of the output signal over time and/or only the maximum and minimum levels of chrominance and saturation of the image for each group of one or more lines or columns of the image obtained to the display screen when the film is being scanned in the transport mode.

9. A system as claimed in claim 8, wherein the intervals between the maximum and minimum levels shown on the display screen are filled with grey level data.

10. A system as claimed in claim 5, wherein the data processor comprises one or more Field Programmable Gate Array devices.

11. A system as claimed in claim 1, wherein the system is configured such that the output signal level and/or saturation, chrominance and luminance of the digital image obtained may be displayed either as obtained by scanning the film or after one or more image correction steps have been carried out.

* * * * *